United States Patent [19]

Huang et al.

[11] 4,247,432
[45] Jan. 27, 1981

[54] WATER PURIFICATION EMPLOYING POLY(BETA-ALANINE)

[75] Inventors: Sun Y. Huang, Stamford; Michael M. Fisher, Ridgefield, both of Conn.

[73] Assignee: American Cyanamid Company, Stamford, Conn.

[21] Appl. No.: 60,534

[22] Filed: Jul. 25, 1979

[51] Int. Cl.³ .............................................. C08L 77/00
[52] U.S. Cl. .............................. 260/29.2 N; 210/728
[58] Field of Search ................... 260/29.2 N; 210/54; 528/310, 328

[56] References Cited

U.S. PATENT DOCUMENTS

| | | | |
|---|---|---|---|
| 2,826,560 | 3/1958 | Hulse et al. | 525/294 |
| 3,200,098 | 8/1965 | Goren | 526/306 |
| 3,755,158 | 8/1973 | Inazuka et al. | 210/54 R |
| 4,125,519 | 11/1978 | Goodman et al. | 210/54 R |

FOREIGN PATENT DOCUMENTS 46-14542  4/1971  Japan .

*Primary Examiner*—Theodore E. Pertilla
*Attorney, Agent, or Firm*—Paul W. Leuzzi, II

[57] ABSTRACT

Poly(beta-alanine) acts as an effective flocculant in water treatment, especially those waters containing colloidal suspensions. In solution, these polymers exhibit a degree of metastability of significance in the flocculation of effluent substrates.

12 Claims, No Drawings

… (4,247,432)

WATER PURIFICATION EMPLOYING POLY(BETA-ALANINE)

This invention generally relates to a novel process for the purification and clarification of water, i.e., a water treatment process wherein the water is treated with a metastable solution of poly(beta-alanine) in order to flocculate suspended solids.

During recent years, the cleanliness of the environment has become the concern of everyone. Lakes and streams remote from industrial and urban centers have been found to be contaminated. With the continued growth of large population centers and the formation of new industries, the demands placed upon waterways continue to tax natural resources. Clean water and the treatment of wastes are now national concerns, the resolution of which is of prime importance.

Flocculation of aqueous dispersions is an important operation in the purification and clarification of contaminated waters. An aqueous dispersion is a system comprising at least two phases: a continuous aqueous phase and a dispersed phase of suspended paritcles. The suspended particles may vary in size from larger particles which are a by-product of industrial and municipal wastes that often lend a distinct color to the contaminated water, to smaller particles of natural water which, although not distinctly visible, lend a definite turbidity which affects the water's clarity.

The waters with which the present invention deals range from the natural waters derived from rain, snow, rivers, wells, lakes, ponds, and the like to waste waters derived from municipalities and industries, such as pulp mills, steel mills, chemical plants and the like.

In order to flocculate aqueous dispersions, it has been customary in the past to use materials such as alum, feric salts and the like which are transformed into their hydroxides or to use organic flocculants. In those instances where the aqueous dispersions have been chlorinated, the chlorine often interacts with the flocculants, thereby degrading them.

Thus, there exists the need for a novel flocculant for use in water purification and clarification which is effective in water treatment systems including those systems in which the water is chlorinated.

SUMMARY OF THE INVENTION

Poly(beta-alanine) has been found to be an effective flocculant for water purification and clarification. Poly(beta-alanine) is commonly known as a vitamin B complex component whose synthesis was taught in U.S. Pat. No. 2,826,560 issued to Hulse et al. in 1958. Poly(beta-alanine) solutions have been found to be a highly effective flocculant, exhibiting a degree of metastability of significance in the flocculation of effluent substrates.

DETAILED DESCRIPTION OF THE INVENTION

In accordance with the present invention, there is provided a flocculation process for use in water purification and clarification systems that comprises adding to an aqueous dispersion of flocculatable material an effective amount of poly(beta-alanine) wherein said poly(beta-alanine) is of the general structure: $+CH_2CH_2-CONH)_{\overline{n}}$ wherein n is of a magnitude such that the inherent viscosity ($\eta_{inh}$) is greater than about 0.2, settling the flocculatable material and thereafter recovering the purified and clarified water.

The poly(beta-alanine) employed in the process of the instant invention may be prepared according to any conventional method. One such method is disclosed in U.S. Pat. No. 2,826,560, issued to Hulse et al. in 1958 and hereby incorporated herein by reference. Specifically, sublimed acrylamide and a nonaqueous solvent are mixed together and purged with an inert gas, such as nitrogen, at room temperature. The nonaqueous solvents which may be used include the hydrocarbon solvents such as hexane, octane, benzene, o-dichlorobenzene, etc.; ethers such as dioxane, dibutyl ether, etc.; and basic solvents such as pyridine, quinoline, etc. The mixture is heated until all of the acrylamide is dissolved and then a strong basic catalyst is added. The catalyst employed should have a basic strength at least as strong as that of potassium hydroxide as for example, the alkali metal hydroxide such as sodium hydroxide; quaternary ammonium hydroxides such as benzyltrimethylammonium hydroxide; alkali metal alkoxides such as sodium methoxide, sodium ethoxide, sodium tertiary butoxide, etc.; and the corresponding potassium alkoxides; alkali metal hydrides such as sodium hydride; and alakli metals themselves. The reaction between the acrylamide and the catalyst is exothermic, pushing the temperature immediately to the 100° C. plus range. The reaction is allowed to procede for approximately four hours, during which time the solid polymer precipitates. The polymer is separated by decantation, redissoluted in formic acid and reprecipitated in isopropanol.

High molecular weight poly(beta-alanine) cannot be dissolved in common organic solvents or water and thus require saturated salt solutions such as calcium chloride, zinc chloride, or aqueous acids such as sulfuric acid, formic acid, nitric acid, trifluoroacetic acid and the like.

The poly(beta-alanine) employed in the process of the instant invention has an inherent viscosity ($\eta_{inh}$) greater than about 0.2 for a 0.5% polymer in 88% formic acid, preferably about 0.35 to 1.0 and even more preferably about 0.75 to 1.0. The poly(beta-alanine) polymer is generally effective in an amount equal to or greater than 0.1% solution. Solutions prepared using water insoluble poly(beta-alanine) were found to be the most effective flocculants. These solutions exhibit a degree of metastability, important for the effective flocculation of an effluent substrate. Those poly(beta-alanine) solutions dissolved in either acidified calcium chloride solutions or saturated calcium chloride further exhibited a degree of cationicity believed to be due to either protonation of the amide group or association of the calcium ions with the polymer.

Waters capable of treatment by the process of the instant invention include, but are not limited to, the raw waters such as those derived from rain, snow, rivers, wells, lakes, ponds and the like; industrial waste waters such as pulp mill brown water, chemical plant waste waters and the like; and municipal waste treatment waters derived from sewage and sludge treatments. As indicated above, the flocculatable materials contained in these waters range in size from the large particulate industrial and municipal waste by-products to those micro particles naturally occuring in raw waters.

The effectiveness of the instant process employing poly(beta-alanine) increases upon the addition of trace amounts of acid, such as hydrochloric acid. Additionally, the process of the instant invention may be used where the poly(beta-alanine) is combined with other known flocculants such as melamine-formaldehyde acid colloids, polyquaternary polymers, and the like. Evidence indicates that mixtures of the poly(beta-alanine) with known commercial flocculants, such as the melamine-formaldehyde acid colloids, improves the performance of the known commercial flocculants, such as in waters containing chlorine.

The following specific examples illustrate certain aspects of the present invention, and more particularly, point out methods of evaluating the purification and clarification of waste waters through the use of the instant process. However, the examples are set forth for illustration only and are not to be construed as limitations on the present invention except as set forth in the appended claims. All parts and percentages are by weight unless otherwise specified.

GENERAL PROCEDURE: BENTONITE

100 Parts of ground bentonite is added to 3000 parts of deionized water. The solution is vigorously stirred and allowed to stand for 24 hours. The upper two-thirds is siphoned off leaving a bentonite slurry. The remaining solution is diluted with deionized water until a solids content of 100 parts per million is achieved. To this slurry is added 1 part of calcium chloride solution (0.1 M), 1 part of magnesium sulfate (0.083 M) solution and 1 part of sodium bicarbonate (0.3 M). The pH is then adjusted to within the range of 6.8–7.2.

A 1000 part sample of the conditioned bentonite slurry is placed into a suitable container equipped with a stirring mechanism. The slurry is vigorously stirred for 1 minute at 100 rpm. To this slurry is added a polymer solution as the flocculant. The slurry is then subjected to a second stirring for 15 minutes at 40 rpm and thereafter allowed to stand for 15 minutes.

The turbidity of the clarified liquid is measured by a turbimeter. Flocculation results are reported in terms of the ppm of polymer necessary to reduce the turbidity to 20% of the initial value.

EXAMPLE 1

The General Procedure specified above for bentonite is followed in every material detail. The polymer solution employed consists of 0.1 part poly(beta-alanine) having an inherent viscosity of 0.62 as determined for 0.5% polymer in 88% formic acid, 0.7 part of $H_2SO_4$, 0.5 part of HCOOH and 98.7 parts deionized water. Test results are given in Table I.

COMPARATIVE EXAMPLE A

The General Procedure specified above for bentonite is followed in every material detail. A polymer solution is not employed, rather a control solution consisting of 0.7 part of $H_2SO_4$, 0.5 part of HCOOH and 98.7 part of deionized water is employed. Test results are given in Table I.

COMPARATIVE EXAMPLE B

The General Procedure shown above for bentonite is followed in every material detail. The polymer solution employed consists of 0.1 part polyacrylamide having an inherent viscosity of 0.66 as determined for 0.5% polymer in 1.0 N NaCl solution, 0.7 part of $H_2SO_4$, 0.5 part of HCOOH and 98.7 parts of deionized water. Test results are given in Table I.

TABLE I

| FLOCCULATION OF BENTONITE SUSPENSIONS | |
|---|---|
| EXAMPLE | ppm to reduce turbidity 20% |
| Comparative A | 30 - no appreciable reduction |
| 1 | 8.4 |
| Comparative B | 30 - no appreciable reduction |

EXAMPLES 2-12

The General Procedure for bentonite shown above is followed in every material detail employing therein as the polymer flocculant solution a poly(beta-alanine) solution as set forth in Table II. Test results are given in Table II.

COMPARATIVE EXAMPLES C-E

The General Procedure for bentonite specified above is followed in every material detail employing as the polymer flocculant solution a melamine-formaldehyde acid colloid solution having a melamine-formaldehyde mole ratio of 1:8. The solution contains 0.1% polymer. Test results are given in Table II.

TABLE II

| | FLOCCULATION OF BENTONITE SUSPENSIONS | | | | | |
|---|---|---|---|---|---|---|
| | Poly(beta-alanine) | Polymer Constituents (parts) | | | | ppm to reduce |
| EXAMPLE | $\eta$inh* | Polymer | $CaCl_2$ | HCl | $H_2O$ | turbidity 20% |
| 2 | 0.24 | 0.1 | 2.0 | — | 97.9 | 8.65 |
| 3 | 0.45 | 0.1 | 2.0 | — | 97.9 | 5.40 |
| 4 | 0.45 | 0.1 | 3.0 | 0.5 | 96.4 | 4.60 |
| 5 | 0.45 | 0.1 | 3.0 | 1.0 | 95.9 | 3.75 |
| 6 | 0.45 | 0.1 | 5.0 | 1.5 | 93.4 | 2.76 |
| Comparative C | — | 0.1% solution | | | | 4.55 |
| 7 | 0.62 | 0.1 | 3.0 | — | 96.9 | 5.09 |
| 8 | 0.62 | 0.1 | 5.0 | — | 94.9 | 5.15 |
| 9 | 0.62 | 0.1 | 2.0 | 0.14 | 97.8 | 6.54 |
| 10 | 0.62 | 0.1 | 2.0 | 1.0 | 96.9 | 4.00 |
| Comparative D | — | 0.1% solution | | | | 4.00 |
| 11 | 0.75 | 0.1 | 2.0 | 0.23 | 97.7 | 5.90 |
| 12 | 0.75 | 0.1 | 2.0 | 0.50 | 97.4 | 5.75 |
| Comparative E | — | 0.1% solution | | | | 4.72 |

*Inherent viscosity of the polymer as determined for 0.5% polymer in 88% formic acid.

GENERAL PROCEDURE: HUMIC ACID

4 Parts of humic acid (a model system for kraft pulp effluent) are added to 40 parts of 0.5 N NaOH and 760 parts deionized water. After vigorous agitation the solution is allowed to stand for 24 hours. The upper three-fourths of the solution is used as the stock solution.

6 Parts of the humic acid stock solution is mixed with 1 part of calcium chloride (0.1 M), 1 part of magnesium sulfate (0.083 M) and 1 part of sodium. To the solution is added 1000 parts of deionized water. The pH is then adjusted to within the range of 6.8–7.2. The resulting solution corresponds to 30 ppm of humic acid.

A 1000 part sample of the resulting humic acid solution is measured into a suitable vessel equipped with a stirring mechanism. The solution is vigorously stirred for 1 minute at 100 rpm. To this slurry is added a polymer solution as the flocculant. The slurry is than subjected to a second stirring for 25 minutes at 25 rpm and thereafter allowed to stand for 10 minutes.

The optical density of the supernatant phase and initial humic acid substrate without flocculant are measured by a colorimeter and compared with the humic acid substrate with flocculant. The dosage required (in parts per million) to reduce the optical density to 20% of its initial value is designated $OD_{20}$.

EXAMPLES 13–20

The General Procedure for humic acid specified above is followed in every material detail employing therein as the polymer flocculant solution a poly(beta-alanine) solution as set forth in Table III. Test results are given in Table III.

COMPARATIVE EXAMPLES F–G

The General Procedure shown above for humic acid is followed in every material detail employing therein as the polymer flocculant solution a melamine-formaldehyde acid colloid solution having a melamine-formaldehyde mole ratio of 1:8. The solution contains 0.1 and 0.2 percent polymer respectively. Test results are given in Table III.

EXAMPLES 21–24

Following the General Procedure shown above for bentonite in every material detail except that 0.4 part of a solution containing 5% $Cl_2$ is added to the 1000 parts of conditioned bentonite slurry. This enables a test for chlorine resistance. The polymer flocculant solution employed is a poly(beta-alanine) solution as set forth in Table IV wherein the poly(beta-alanine) has an inherent viscosity of 0.62.

COMPARATIVE EXAMPLES H–I

The procedure of Example 20 is followed in every material detail except that the polymer flocculant solution is a 0.1% solution of melamine-formaldehyde acid colloid with a melamine-formaldehyde mole ratio of 1:8.

TABLE IV

CHLORINE RESISTANCE

| EXAMPLE | $Cl_2$ Solution | Polymer Constituents (parts) | | | | ppm to reduce turbidity 20% | % $Cl_2$* Resistance |
| --- | --- | --- | --- | --- | --- | --- | --- |
| | | Polymer | $CaCl_2$ | HCl | $H_2O$ | | |
| 21 | — | 0.1 | 5 | 1.5 | 93.4 | 2.5 | — |
| 22 | 0.4 | 0.1 | 5 | 1.5 | 93.4 | 3.3 | 77 |
| 23 | — | 0.1 | 5 | — | 94.9 | 5.15 | — |
| 24 | 0.4 | 0.1 | 5 | — | 94.9 | 5.0 | 97 |
| Comparative H | — | 0.1% solution | | | | 3.1 | — |
| Comparative I | 0.4 | 0.1% solution | | | | — | No |

*% $Cl_2$ Resistance = $\frac{T_{20} \text{ Dosage (no } Cl_2)}{T_{20} \text{ Dosage (with } Cl_2)} \times 100$

EXAMPLE 25

When the procedure of Example 20 is followed in every material detail except that the poly(beta-alanine) employed exhibited an inherent viscosity of 1.0 in 88% formic acid, the dosage required to reduce the optical density to 20% of its initial value was substantially the same as that required with lower inherent viscosities.

What is claimed is:

1. A flocculation process for use in water purification and clarification systems that comprises adding to an aqueous dispersion of flocculatable material an effective amount of a solution that consists essentially of:
   (a) 0.1 to 0.5 percent by weight of poly(beta-alanine) wherein said poly(beta-alanine) is of the general structure:

TABLE III

FLOCCULATION OF HUMIC ACID

| EXAMPLE | Poly(beta-alanine) $\eta inh$* | Polymer Constituents (parts) | | | | $OD_{20}$ ppm |
| --- | --- | --- | --- | --- | --- | --- |
| | | Polymer | $CaCl_2$ | HCl | $H_2O$ | |
| 13 | 0.38 | 0.2 | 6.0 | 1.5 | 192.8 | 194 |
| 14 | 0.38 | 0.2 | 6.0 | 2.0 | 191.8 | 174 |
| 15 | 0.45 | 0.2 | 6.0 | 1.5 | 192.8 | 194 |
| 16 | 0.45 | 0.2 | 6.0 | 2.0 | 191.8 | 152 |
| Comparative F | — | 0.1% solution | | | | 150 |
| 17 | 0.55 | 0.5 | 15.0 | 21 | 234.5 | 78 |
| 18 | 0.55 | 0.5 | 15.0 | 10 | 224.5 | 64 |
| 19 | 0.75 | 0.5 | 15.0 | 21 | 240.0 | — |
| 20 | 0.75 | 0.5 | 15.0 | 10 | 224.5 | 15 |
| Comparative G | — | 0.2% solution | | | | 74 |

*Inherent viscosity of the polymer as determined for 0.5% polymer in 88% formic acid.

wherein n is of such a magnitude such that the inherent viscosity ($\eta_{inh}$) is greater than about 0.2;
  (b) 2 to 6 percent by weight of either calcium chloride or zinc chloride;
  (c) 0 to 7.7 percent by weight of an acid selected from the group consisting of hydrochloric acid, formic acid, sulfuric acid, nitric acid and trifluoroacetic acid; and
  (d) 97.9 to 85.8 percent by weight water, settling the flocculatable material and thereafter recovering the purified and clarified water.

2. The process of claim 1 wherein the aqueous dispersion of flocculatable material is a raw water containing up to about 10,000 parts per million of suspended organic solids, said solids having a particle size of about two microns.

3. The process of claim 2 wherein the amount of poly(beta-alanine) added to said raw water is from about 1 to 20 parts per million.

4. The process of claim 2 wherein the raw water contains chlorine.

5. The process of claim 1 wherein the aqueous dispersion of flocculatable material is a kraft effluent containing humic acid of a particle size within the range of 100 angstroms to about 1 micron.

6. The process of claim 5 wherein the amount of poly(beta-alanine) added to said kraft effluent is from about 100 to 500 parts per million.

7. The process of claim 1 wherein $\eta_{inh}$ of poly(beta-alanine) employed is about 0.35 to 1.0.

8. The process of claim 1 wherein $\eta_{inh}$ of the poly(beta-alanine) employed is about 0.75 to 1.0.

9. The process of claim 1 wherein the flocculatable material includes metallic salts.

10. The process of claim 9 wherein the flocculatable material is calcium chloride.

11. The process of claim 1 wherein the aqueous dispersion is made nominally acidic.

12. The process of claim 1 wherein the solution added to the aqueous dispersion of flocculatable material consists essentially of:
  (a) 0.1 to 0.5 percent by weight of said poly(beta-alanine);
  (b) 2 to 6 percent by weight of calcium chloride;
  (c) 0 to 7.7 percent by weight of hydrochloric acid and
  (d) 97.9 to 85.8 percent by weight of water.

* * * * *